Feb. 22, 1944.  W. A. DERR  2,342,125
SUPERVISORY CONTROL SYSTEM
Filed July 25, 1942  6 Sheets-Sheet 3

WITNESSES:  INVENTOR
Willard A. Derr.
BY
ATTORNEY

Feb. 22, 1944.    W. A. DERR    2,342,125
SUPERVISORY CONTROL SYSTEM
Filed July 25, 1942    6 Sheets-Sheet 6

WITNESSES:
INVENTOR
Willard A. Derr.
ATTORNEY

Patented Feb. 22, 1944

2,342,125

UNITED STATES PATENT OFFICE 2,342,125

SUPERVISORY CONTROL SYSTEM

Willard A. Derr, Wilkinsburg, Pa., assignor to Westinghouse Electric & Manufacturing Company, East Pittsburgh, Pa., a corporation of Pennsylvania Application July 25, 1942, Serial No. 452,271

19 Claims. (Cl. 171—118)

The present invention relates, generally, to supervisory control systems, and, more particularly, to systems for controlling and indicating from and at a control station the function of synchronism responsive devices at a remote station.

In the operation of remotely disposed power stations, substations, and the like, circuit breakers at the stations often connect circuits of independent power systems and it is necessary that these systems be synchronized before the breakers are closed. Automatic synchronizers at such remote stations function to close the breakers under proper conditions of synchronism.

An object of the present invention is to provide a supervisory control system which shall function to select means at a remote station for closing a selected one of a plurality of circuit breakers for operation by a synchronism responsive device or by direct supervisory control, to indicate the relative frequencies of the potential on the two sides of the selected breaker, to indicate whether the selected breaker is open, or closed, or whether the synchronizing device is connected thereto, and to indicate whether the system in connection is to close the breaker by direct supervisory control or by means of the synchronizing device.

Figure 1:
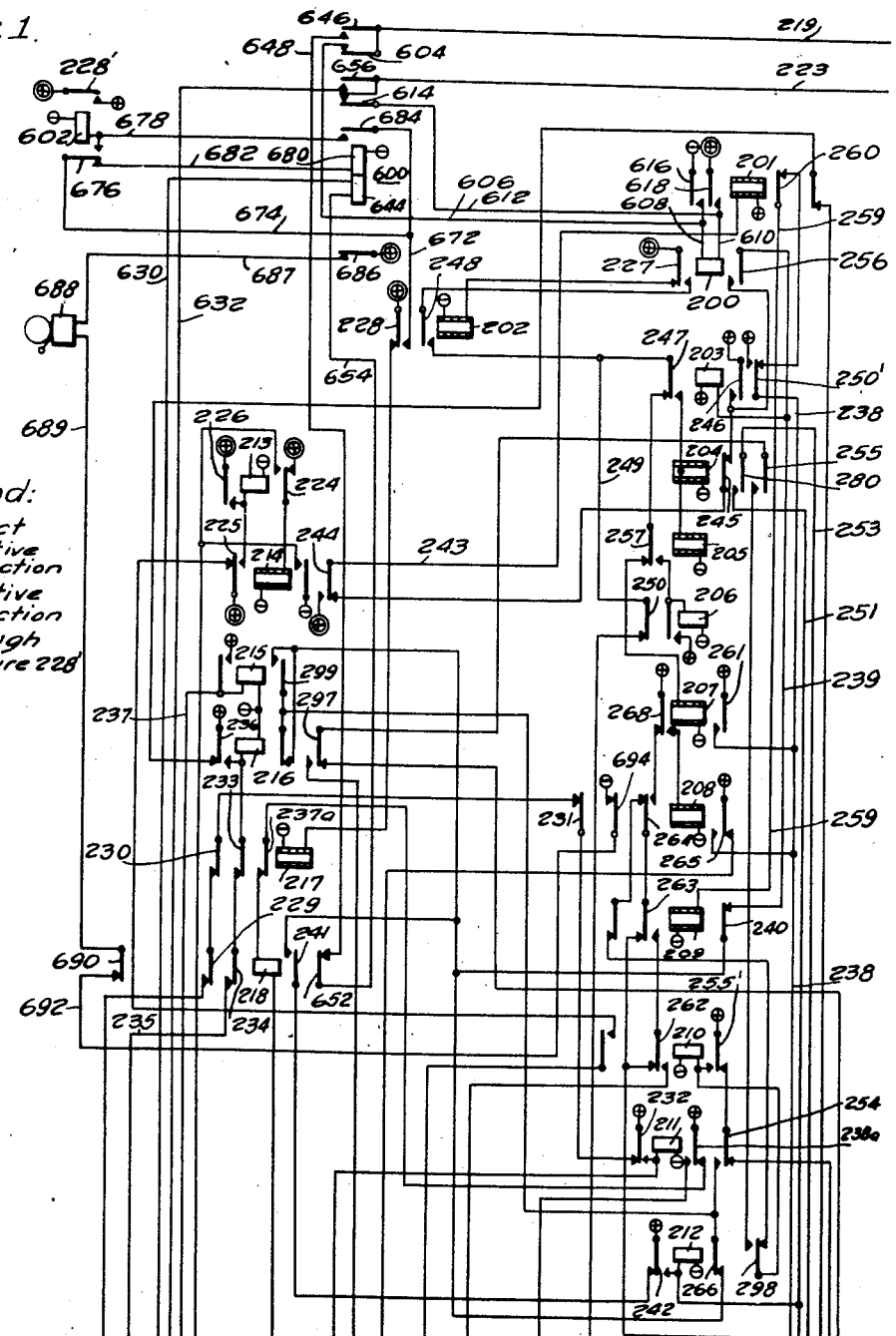
Figure 2:
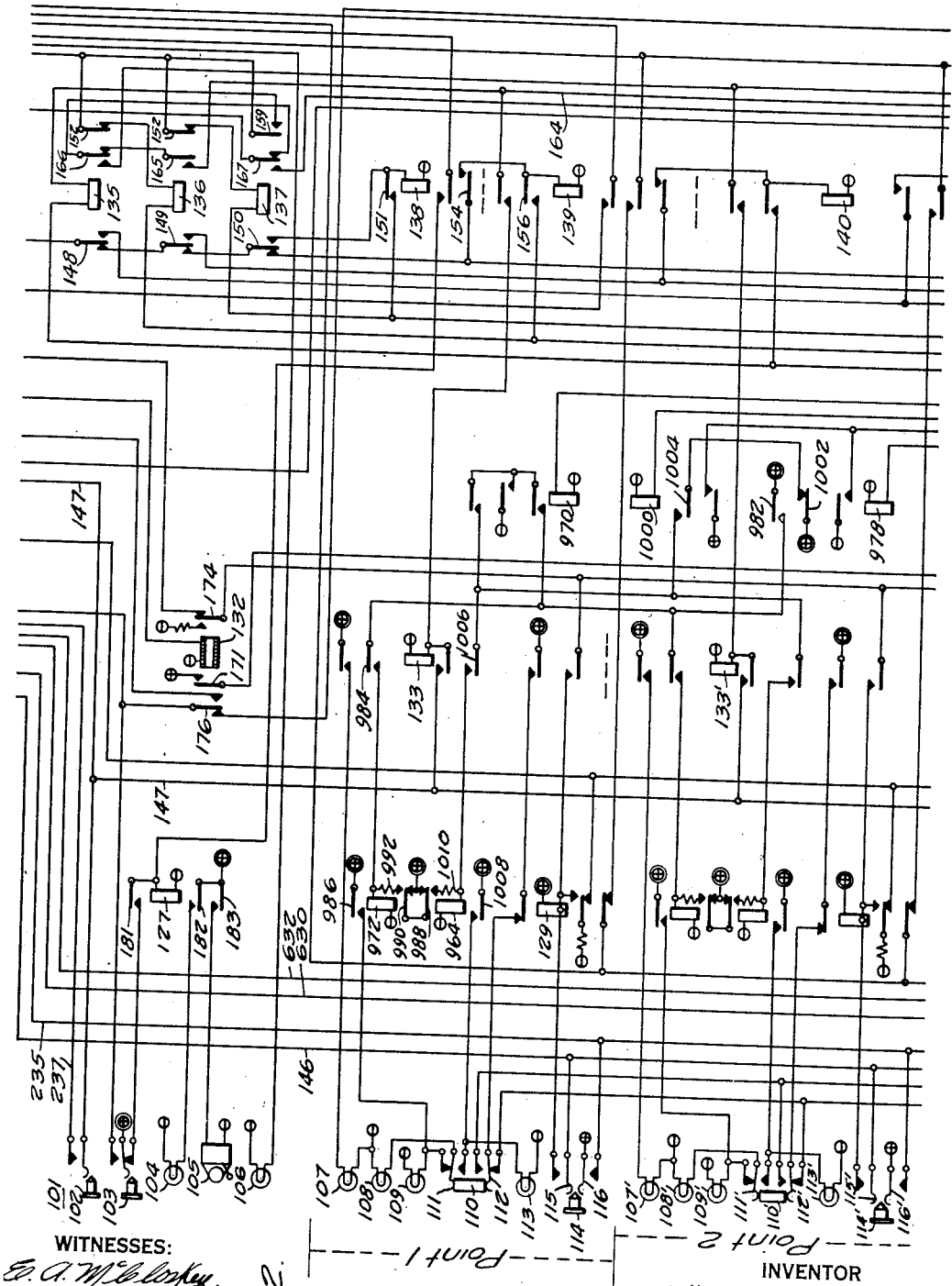
Figure 3:
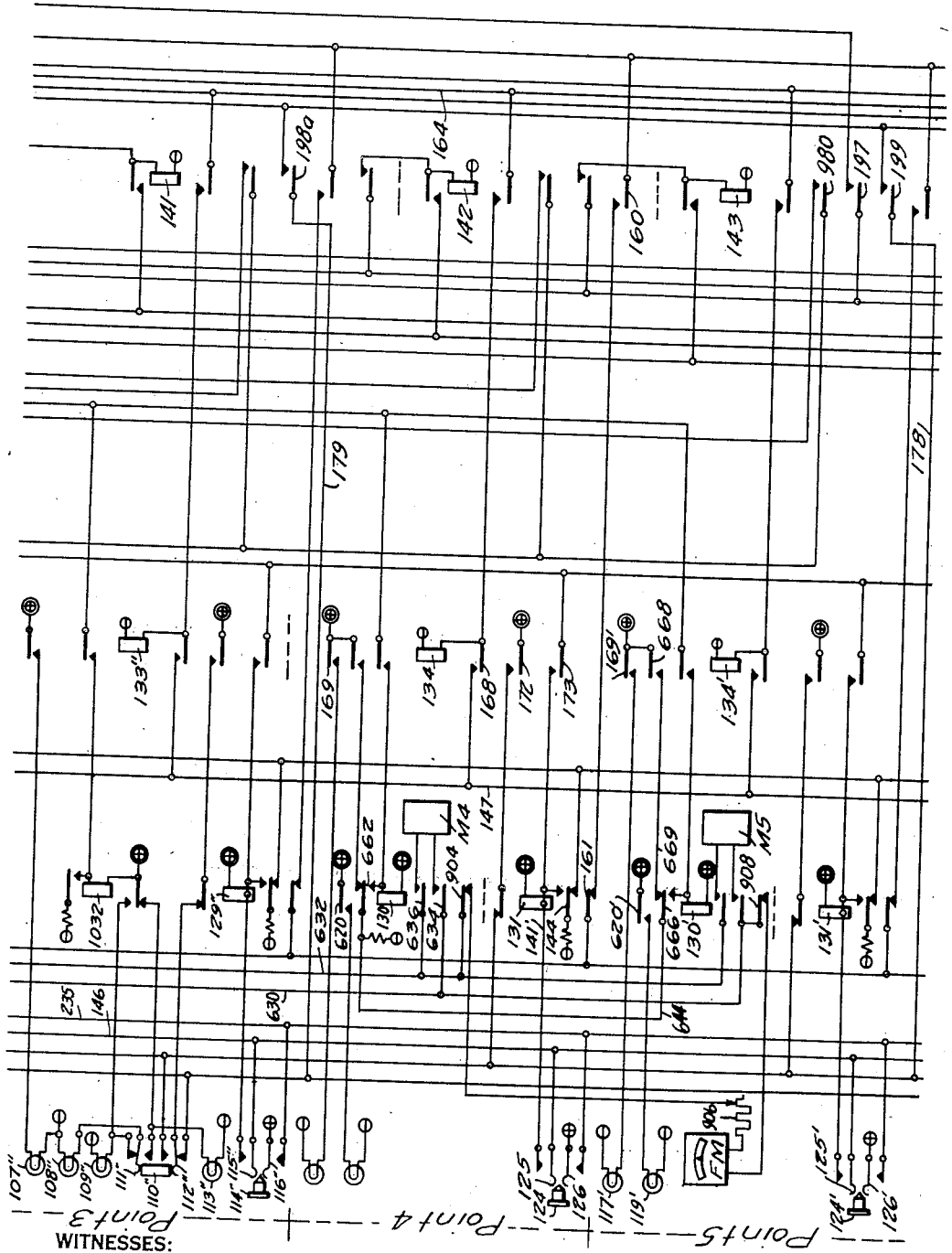
Figure 4:
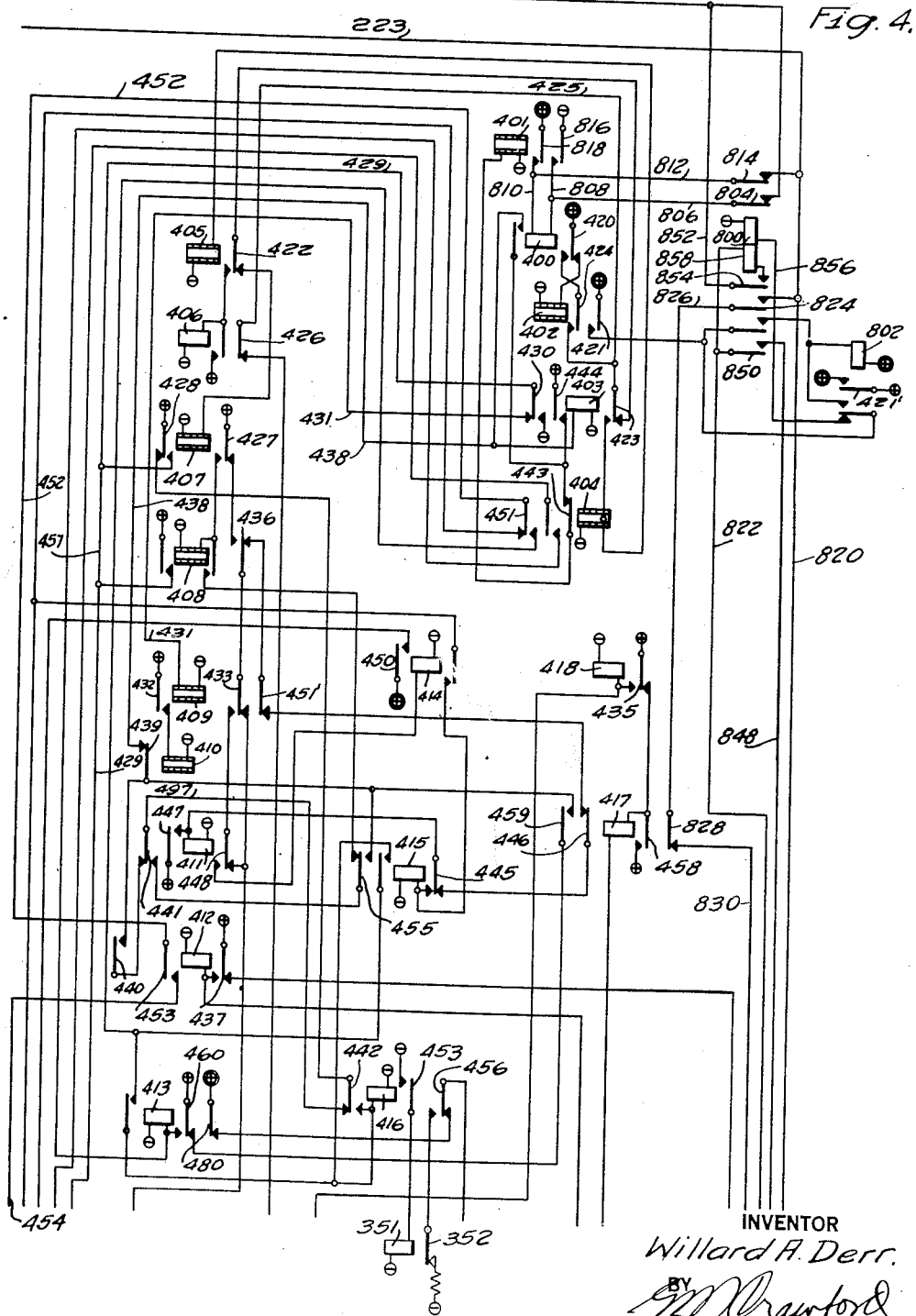
Figure 5:
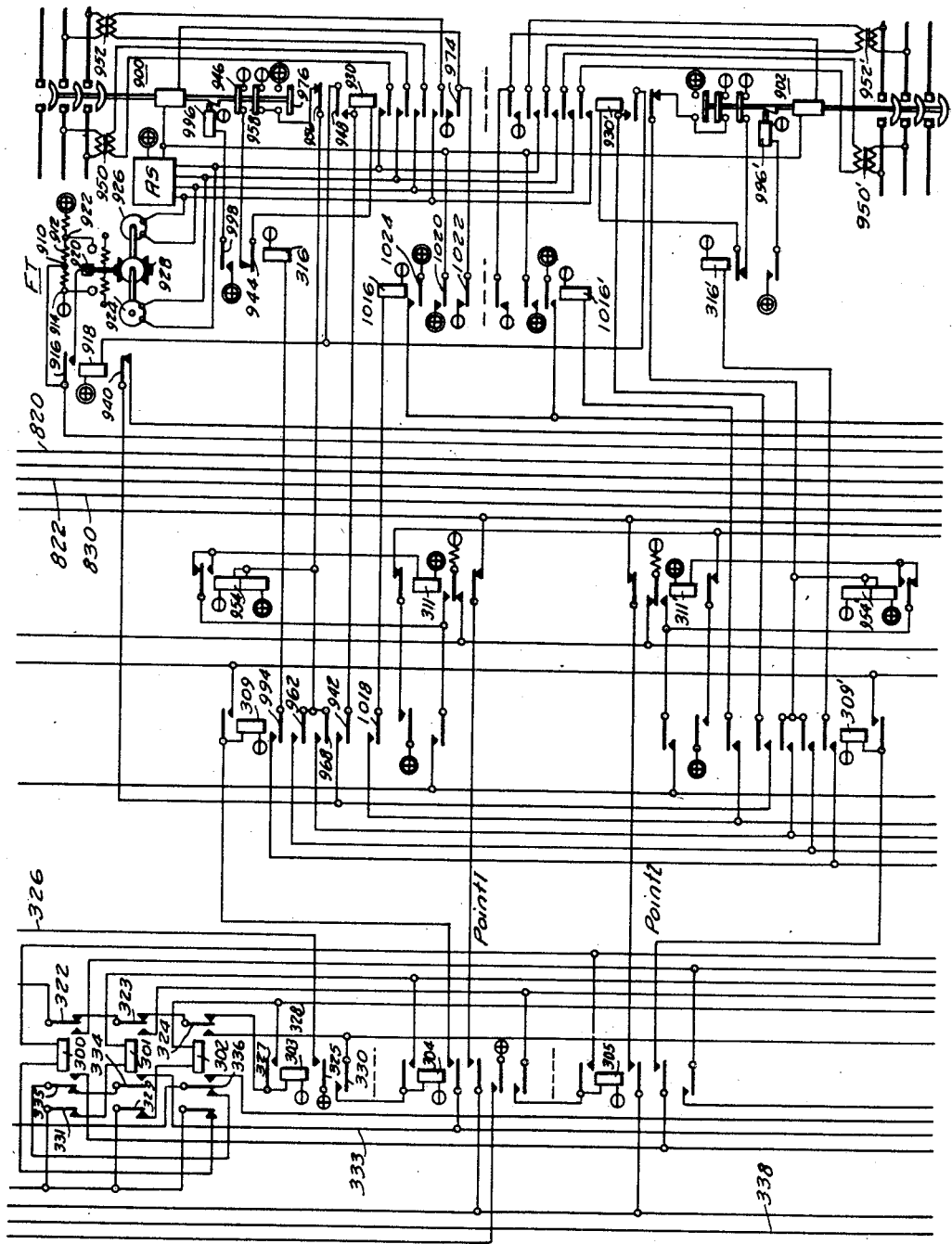
Figure 6:
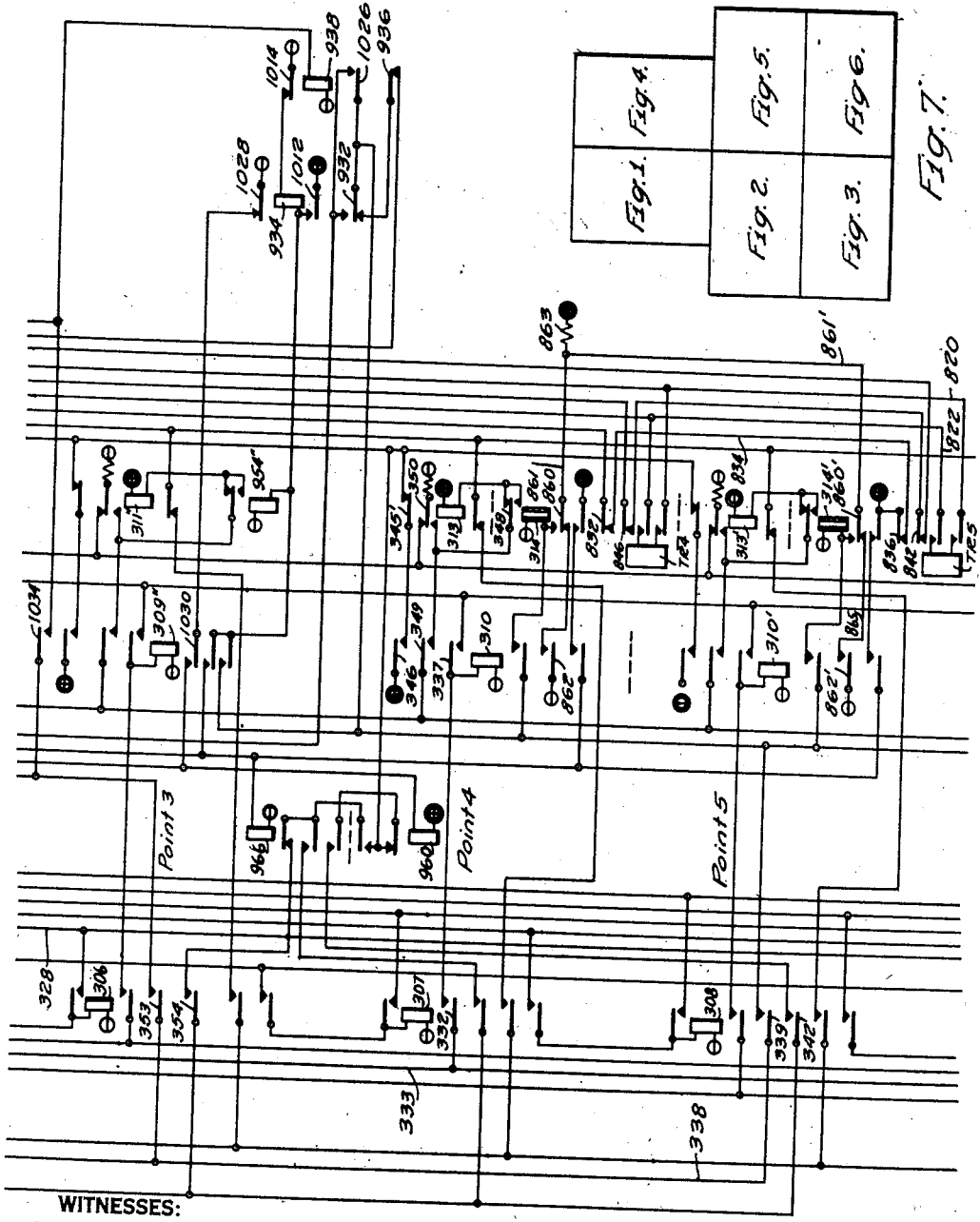

These and other objects and advantages of the invention will be apparent from the following detailed description taken in connection with the accompanying drawings in which Figs. 1 through 6 when taken together in the order indicated by Fig. 7, comprise a supervisory control system embodying the principal features of the invention.

The preferred embodiment of the invention is shown and described herein as it is applied to the supervisory control system of my co-pending application Serial No. 347,626 filed July 26, 1940, now Patent No. 2,314,692, dated March 23, 1943, entitled "Control system," most of the elements of my co-pending application being shown in the same co-operative relation herein as in the co-pending application and bearing the same reference characters as the corresponding elements in the co-pending application. Certain relays, conductors and other elements of structure have been omitted and others added, and certain relay contact elements have been added to the relays of the co-pending application. These added elements have been designated by reference characters not found in the co-pending application.

For convenience of description, to avoid needless repetition, and in order that the invention may be more clearly set forth and understood, reference will be made in this specification to the above identified co-pending application for the description of the elements and combinations of elements and their functioning that are common to the two systems.

In practicing the invention, the system of my co-pending application hereinbefore referred to has been altered to include five operating points, two of which are associated with remotely-disposed circuit breakers at such a remote station as a power station, substation or the like. Another of the operating points functions to select manual operation or operation of the circuit breakers by an automatic synchronizer. The remaining two operating points are connected to function as metering points as described in the above referred to application. In addition to performing their metering functions, these remaining two points also function to give an indication of the relative frequencies of the potentials on the two sides of either selected one of the two circuit breakers.

Considering the general aspects of the invention, circuit breakers 900 and 902 at the remote station are each disposed to connect two sets of conductors together as indicated and to be controlled and supervised over the supervisory control system from the control station by the points 1 and 2. An automatic synchronizer AS is disposed to be rendered operative to close the selected one of the circuit breakers 900 and 902 when synchronism between the potentials on the two sides of the selected breaker is attained.

A frequency responsive device FT at the remote station and a frequency meter FM at the control station are disposed to be connected over the supervisory control circuit when the meters M4 and M5 and the transmitters TR4 and TR5 which are associated with points 4 and 5 are released, and the frequency meter FM will indicate the relative frequencies on the two sides of a selected breaker. The point 3 functions to selectively connect the breakers 900 and 902 for automatic closure by the synchronizing device or by manual control over the supervisory control system.

Indicating lamps 109 and 113 associated with point 1 and indicating lamps 109' and 113' associated with point 2 at the control station, indicate the positions of the breakers 900 and 902 and indicate whether the automatic synchronizer is connected in operative relation with one of the breakers. Indicating lamps 109" and 113" associated with point 3 at the control station indicate whether the breakers 900 and 902 are connected to be closed by the automatic synchronizer or manually over the supervisory control system.

The details of the structure and functioning of the system may best be understood from the following detailed description of the operation of the system. For convenience of description and understanding of the invention, reference will be made to the applicant's above mentioned co-pending application Serial No. 347,626, now Patent No. 2,314,692, dated March 23, 1943, for the functioning of the parts of the system which are common to the two systems.

With the meters M4 and M5 disconnected, the frequency meter FM will be connected in the metering circuit and will be energized in a circuit extending from positive potential at the remote station through the contact element 836 of the relay 314', the contact element 832 of the relay 314, the contact element 828 of the relay 417, the contact element 824 of the metering line relay 800, the line conductor 223 to the control station, the contact element 656 metering line relay 600, a contact element 904 of the relay 130, a variable calibrating resistor 906, the frequency meter FM, a contact element 908 of the relay 130' the coil 644 of the metering line relay 600, the contact element 652 of the relay 218, the contact element 646 of the relay 600, the line conductor 219 to the remote station, the contact element 854 of the relay 800, the coil of the relay 800, the contact element 850 of the relay 800, contact element 846 of the relay 314, and the contact element 842 of the relay 314' to the terminal 910 of a tapped resistor 912. The circuit of the frequency meter will thus be energized by the portion of the potential drop across the resistor 912 between the positive end of the resistor and the tap 910. The variable resistor 906 may now be adjusted by the operator at the control station to produce an indication by the frequency meter FM substantially at the center of the meter scale.

The return connection to the resistor 912 is disposed to be connected to a tap 914 of the resistor 912 through a contact element 916 of a relay 918 and a contact element 920 of the frequency responsive device FT when in the left hand circuit closing position. This connection will energize the frequency meter circuit with full battery potential to thus increase the deflection of the frequency meter FM. When the contact element 920 of the frequency responsive device FT is in the right hand circuit closing position with the relay 918 actuated, the return connection of the frequency meter circuit will be connected to a tap 922 of the resistor 912 which will cause a smaller potential to be applied to the frequency meter circuit than is applied when the return connection is connected to the tap 910. This will cause the deflection of the frequency meter FM to decrease.

The frequency responsive device FT comprises synchronous motors 924 and 926 which drive a differential mechanism 928. Differences in the speeds of the motors 924 and 926 will cause the differential mechanism 928 to move the contact element 920 to the right or left circuit closing position depending upon which of the motors 924 and 926 has the greater speed.

With the frequency meter FM connected in circuit and calibrated by the variable resistor 906 to indicate the center position, when it is desired to close the circuit breaker 900, the operator will move the operation control key 110 from the vertical position shown in the drawings to horizontal position and will then actuate the operate key 114 momentarily, which will energize the starting relay 129, and in conjunction with the coding, selecting and control apparatus, will select and operate the individual point relay 309 at the remote station as explained in the hereinbefore referred to co-pending application. Following the operation of the point relay 309, checking impulses are sent back to the control station to select and operate the point selecting relay 133 which is individual to the point 1. The actuation of the relay 133 will energize the check lamp 107 indicating that the selected circuit breaker 900 has been selected and prepared for operation at the remote station.

The master control key 101 may be operated next to cause the selecting, coding and control apparatus at the control station and the remote station to energize a synchronizing relay 930 in a circuit extending from positive potential through the contact element 450 of the relay 414, the contact element 339 of the relay 308, a contact element 932 of a connecting relay 934, a contact element 936 of a release relay 938, a contact element 940 of the relay 918, a contact element 942 of the relay 309, the winding of the relay 930, a contact element 944 of the relay 316, and a contact element 946 operated by the circuit breaker 900 to negative potential.

The relay 930 will energize the relay 918 and close its own holding circuit extending from positive potential through the winding of the relay 918, a contact element 948 of the relay 930, the winding of the relay 930, the contact element 944 and the contact element 946 to negative potential. This actuation of the relay 918 will move the contact element 940 to open circuit position and close the contact element 916.

The relay 930 will connect the automatic synchronizer AS and the motors 924 and 926 of the frequency responsive device FT to be energized by the potentials of the transformers 950 and 952.

Normally, with the relay 930 deenergized and the circuit breaker 900 in open position, a double opposed-coil relay 954 will be energized from positive potential through the lower winding of the relay 954, a contact element 956 of the relay 930 and a contact element 958 actuated by the circuit breaker 900 to negative potential. An indicating code control relay 960 will also be energized from positive potential through the relay 960, a contact element 962 of the relay 309 and contact elements 956 and 958 to negative potential. With relays 954 and 960 thus actuated, the indicating relay 964 at the control station will be held energized over its own holding circuit to indicate by the energization of the signal lamp 113 that the breaker 900 is open.

When the relay 930 is actuated as hereinbefore described, the opening of the contact element 956 will remove negative potential from the relays 954 and 960. The relay 954 will be released by the energization of its two opposing windings, and the relays 960 and 966 will be energized in series circuit relation in a circuit which extends from positive potential through the relay 960, contact elements 962 and 968 and the relay 966 to negative potential. The release of the relay 954 and the actuation of relays 960 and 966 will cause an indicating control code to be sent to the control station to energize a signal control relay 970 which will apply negative potential to both the indicating relay 964 and an indicating relay 972. The relay 972, having been deenergized, will remain deenergized, and the relay 964 which was previously energized will be shunted down to deenergize the indicating lamp 113. The condition of deenergization of both of the lamps 109 and 113 will indicate to the operator at the control station that the automatic synchronizer and the synchronism indicating device are connected for operation at the remote station.

With the synchronous motors 924 and 926 of the frequency responsive device FT connected for energization through the transformers 950 and 952, these motors will rotate at speeds which are proportional to the frequencies of the potentials on the two sides of the circuit breaker 900. If the frequency of the potential on one side of the circuit breaker 900 is greater than that on the other side, the differential device 928 will cause the contact element 920 to move to circuit closing position to the right or to the left depending upon which frequency is the higher to thereby increase or decrease the deflection of the meter FM at the control station.

From the indication of the frequency meter FM, the operator can ascertain which of the potentials on the two sides of the breaker 900 is the higher and can take whatever means are at his command to make the frequencies on the two sides of the breaker more nearly equal. Such means may be direct control of the generating means at the control station which feeds a circuit which is connected to one side of the circuit breaker 900. Another means may be control of generating means at the remote station over the supervisory control system, or by telephone or other communication with a remote generating station which supplies the potential to one side of the breaker.

The automatic synchronizer AS may be any device which will complete the circuit to connect positive potential to the closing coil of the circuit breaker 900 when the conditions of synchronism obtain between the potentials on the two sides of the circuit breaker. Such a synchronizing device as that described by the Gulliksen Patent No. 1,977,384, issued October 16, 1934, may be used for this purpose.

When the desired synchronism conditions are reached, the automatic synchronizer AS will complete an energizing circuit for the closing winding of the circuit breaker 900 extending from positive potential through the automatic synchronizer and a contact element 974 of the relay 930 to negative potential.

The closure of the circuit breaker 900 will move the contact element 946 to open circuit position to thus break the holding circuit of and release the relays 930 and 918. The closure of the circuit breaker 900 and the release of the relay 930 will cause positive potential to be applied to the relays 954, 960 and 966 in circuits extending from positive potential through a contact element 976 actuated by the circuit breaker 900, the contact element 956 of the relay 930, through the upper winding of the relay 954 to negative potential, through the contact element 962 and the relay 960 to positive potential, and through the contact element 968 and the relay 966 to negative potential. The relay 960 will thus be released, and the relays 954 and 966 will be actuated.

The actuation of the relays 954 and 966 will cause the operation of the parts of the supervisory control system including the starting relay 311, the code control operating relay 309, the selecting relay 308 at the remote station, and the selecting relay 143, the point selecting relay 133 and the supervising relay 132 at the control station. This will complete a circuit for a signal control relay 978 at the control station extending from positive potential through a contact element 171 of the relay 132, a contact element 980 of the relay 141 and the relay 978 to negative potential. The indicating relay 972 will next be energized in a circuit from positive potential through a contact element 982 of the relay 978, a contact element 984 of the relay 133 and the winding of the indicating relay 972 to negative potential. The relay 972 will close an energizing circuit for the signal lamp 109 from positive potential through a contact element 986 of the relay 972 and the signal lamp 109 to negative potential. The relay 972 will close its own holding circuit from positive potential through a contact element 988 of the relay 964, a contact element 990 of the relay 972, a current limiting resistor 992 and the relay 972 to negative potential.

When it is desired to open the circuit breaker 900, the operation control key 110 may be moved from the horizontal position to the position shown in the drawings and the operator will then actuate the operate key 114 momentarily. This will energize the starting relay 129, and in conjunction with the coding, selecting and control apparatus, will select and operate the individual point relay at the remote station as explained hereinabove. Following the operation of the point relay 309, checking impulses are sent back to the control station to select and operate the point selecting relay 133 which is individual to the point 1. The actuation of the relay 133 will energize the check lamp 107 indicating that the selected circuit breaker 900 has been selected and prepared for operation at the remote station.

The master control key 101 may be operated next to cause the selecting, coding and control apparatus at the control station and remote station to energize the tripping relay 316 at the remote station in a circuit extending from positive potential through the contact element 450 of the relay 414, the contact element 353 of the relay 306, a contact element 994 of the relay 309, and the relay 316 to negative potential. The relay 316 will complete an energizing circuit for the trip coil 996 of the circuit breaker 900 extending from positive potential through a contact element 998 of the relay 316 and the trip coil 996 to negative potential.

When the circuit breaker 900 opens, its contact element 976 will move to open circuit position to remove the positive potential connection from the relay 954, thus momentarily releasing the relay 954 until the contact element 958 of the circuit breaker closes to apply negative potential to the relay 954 to thereby cause the relay 954 to pick up by the energization of its lower winding. The momentary release of the supervising relay 954 will cause the starting relay 311 to initiate supervisory operations and the application of negative potential through the contact element 958 of the circuit breaker 900 and the contact elements 962 and 968 of the relay 309 to the relays 960 and 966 will cause the relay 966 to release and the relay 960 to pick up. The coding, selecting and control apparatus at the remote and control stations will actuate the point relay 133 and a signal control relay 1000. The relay 1000 will energize the indicating relay 964 in a circuit extending from positive potential through a contact element 1002 of the relay 987, a contact element 1004 of the relay 1000, a contact element 1006 of the relay 984 and the relay 964 to negative potential. The relay 964 will energize an "open" indicating lamp 113 in a circuit extending from positive potential through a contact element 1008 of the relay 964 and the lamp 113 to negative potential. The relay 964 will release the relay 972 to thereby deenergize the indicating lamp 109 by opening its holding circuit when the contact element 988 of the relay 964 is actuated, and will close its own holding circuit from positive potential through the contact element 990 of the relay 972, the contact element 988, a current limiting resistor 1010 and the relay 964 to negative potential.

The selecting, coding and control apparatus associated with point 3 has been adapted to selectively connect the circuit breakers 900 and 902 for automatic synchronizer control as hereinbefore described, or manual control over the coding, selecting and control apparatus associated with points 1 and 2. With the circuit breaker 900 in open position, if it is desired to close the breaker manually instead of by means of the automatic synchronizer, the operator will move the position control key 110'' from the position shown in the drawings to the horizontal position and then actuate the control key 114'' momentarily. This will energize the starting relay 129'', and, in conjunction with the coding, selecting and control apparatus, will select and operate the individual point relay 309'' at the remote station. Following the operation of the point relay 309'', checking impulses are sent back to the control station to select and operate the point selecting relay 133' which is individual to the point 3. The actuation of the relay 133'' will energize the check lamp 107'' indicating that the selected apparatus at the remote station has been selected and prepared for operation.

The master control key 101 may be operated next to cause the selecting, coding and control apparatus to energize the relay 934 at the remote station. The relay 934 will close its own holding circuit extending from positive potential through a contact element 1012 of the relay 934, the relay 934, and a contact element 1014 of the relay 938 to negative potential. The actuation of the relay 934 will open the hereinbefore described energizing circuit for the relay 930 by moving the contact element 932 from the lower to the upper position to thus prevent the connection of the automatic synchronizer AS until the relay 934 is again released.

The starting relay 954'' will be energized simultaneously with the relay 934 and will cause the supervising relay 311'' and the coding, selecting and control apparatus at the remote and control stations to energize an indicating lamp 113'' to indicate to the operator that the circuit breaker has been prepared for manual control.

The operator will next select and operate the control apparatus associated with point 1 and the master control key 101, in response to which a closing relay 1016 at the remote station will be energized in a circuit extending from positive potential through the contact element 450 of the relay 414, the contact element 339 of the relay 308, the contact element 932 of the relay 934 in its upper contact position, a contact element 1018 of the relay 309 and the relay 1016 to negative potential. The actuation of the relay 1016 will energize the closing coil of the circuit breaker 900 in a circuit extending from positive potential through a contact element 1020 of the relay 1016, the closing coil of the circuit breaker 900, and a contact element 1022 of the relay 1016 to negative potential. When the circuit breaker has closed, the supervisory control system will extinguish the "open" indication lamp 113 and energize the "closed" indication lamp 109 at the control station.

The relay 1016 will also close an energizing circuit for the relay 938 extending from positive potential through a contact element 1024 of the relay 1016 and the relay 938 to negative potential. This will break the holding circuit for the relay 934 by actuating the contact element 1014. A contact element 1026 will be closed by the actuation of the relay 938 to take the place of the contact element 1012 of the relay 934 in the hereinbefore described energizing circuit of the relay 1016 to thereby maintain the relay 1016 energized until it is released by the supervisory control system. Upon the release of the relay 1016, the relay 938 will be released to return the apparatus associated with point 3 to normal with the contact element 932 of the relay 934 in the lower contact position in the circuit of the relay 930 as hereinbefore described.

The release of the relay 934 will cause its contact element 1012 to move from the upper contact position to thus remove positive potential from the circuit of the indicating code control relay 960. A contact element 1028 of the relay 934 will close an energizing circuit for the indicating code control relay 960 extending from positive potential through a contact element 1030 of the relay 309'' and the contact element 1028 of the relay 934 to negative potential. The supervisory control system will function in response to the release of the relay 934 and the operation of the indicating code control relay 960 to energize an indicating relay 1032 at the control station to thereby energize an indicating lamp 109'' to indicate that the circuit breakers 900 and 902 have been prepared to be closed by the automatic synchronizer when selected for a closing operation at the control station.

If, after the relay 934 has been operated and has closed its holding circuit to prepare the circuit breaker 900 for manual control over the supervisory control system instead of through the automatic synchronizer AS, it is desired to reconnect the breaker for automatic synchronizer control, the operator may operate the coding, selecting and control apparatus associated with point 3 to select and operate the relay 938 at the remote station. The circuit for the relay 938, when selectively actuated from the control station, extends from positive potential through the contact element 450 of the relay 414, the contact element 353 of the relay 306, a contact element 1034 of the relay 309'' and the relay 938 to negative potential. The actuation of the relay 938 will release the relay 934 as hereinbefore described and the release of the relay 934 will cause its contact element to be reconnected in the control circuit of the relay 930 which, when energized by the selection of the circuit breaker 900 for closure, will connect the automatic synchronizer AS in operative relation with the circuit breaker 900.

The circuit breaker 902 is connected to be controlled by the supervisory control apparatus which is associated with point 2 and by the automatic synchronizer AS when selected for operation by the apparatus of point 2. The point 2 supervisory control apparatus is substantially in duplicate of that of point 1, and corresponding elements of the apparatus are designated by similar reference characters. The control apparatus associated with the circuit breaker 902 at the remote station is substantially a duplicate of that associated with the circuit breaker 900, and the several elements of apparatus bear reference characters similar to those designating corresponding elements of apparatus associated with the circuit breaker 900.

The energizing circuits for the synchronizing relays 930 and 930', which function to connect the automatic synchronizer AS in operative relation with the selected one of the circuit breakers 900 and 902, both extend through the contact element 940 of the relay 918, and the actuation of either of the relays 930 and 930' causes the actuation of the relay 918. When either of the relays 930 and 930' is actuated, therefore, the other cannot be energized, thus preventing the connection of the automatic synchronizer to more than one circuit breaker at one time.

The points 4 and 5 are connected and function substantially the same as described in my above-identified co-pending application. These metering circuits have been modified, however, to connect the frequency meter FM in the metering circuit when both of the sets of metering apparatus are released. In the normal operation of the system, one or the other of the sets of metering apparatus will be connected to give a continuous indication of a metered quantity except during short intervals when coding, selecting and control functions are being performed by the supervisory control system. When it is desired to obtain a frequency indication, both of the sets of metering apparatus may be released as described in my above referred to co-pending application, and this will leave the frequency metering apparatus connected to the supervisory control system ready to be calibrated as described hereinbefore and connected for the frequency indicating function when one of the circuit breakers 900 and 902 is selected by the operator for operation by the automatic synchronizer.

In the event that it is desired to disconnect the automatic synchronizer AS from operative relation with respect to the circuit breaker 900 after it has been connected for such operation and before the breaker is closed, the operator may energize the trip relay 316 by means of the supervisory control system as described hereinbefore. When the relay 316 is actuated, its contact element 944 will open the energizing circuit of the relay 930, thus releasing the relay 930 and disconnecting the automatic synchronizer and the frequency responsive device FT. The tripping relay 316' may be actuated in a similar manner by the supervisory control apparatus associated with point 2 to release the automatic synchronizer from operative relation with the circuit breaker 902.

It is to be understood that the system described herein is applicable to any number of circuit breakers, the system having been described in connection with only two breakers for the purpose of illustrating the interconnections necessary when the single automatic synchronizing and frequency indicating devices are used with any selected one of a plurality of circuit breakers.

It is to be understood that the present invention does not depend for its proper operation upon the particular supervisory control system with which it is shown, nor upon any particular automatic or frequency responsive device.

Thus it will be seen that I have provided a supervisory control system which shall function to select means at a remote station for closing a selected one of a plurality of circuit breakers for operation by a synchronism responsive device, or automatic synchronizer, or by direct supervisory control, to indicate the relative frequencies of the potentials on the two sides of the selected breaker, to indicate whether the selected breaker is open or closed, or whether the synchronizing device is connected thereto, and to indicate whether the system is in condition to close the breaker by direct supervisory control or by means of the synchronizing device.

In compliance with the requirements of the patent statutes, I have shown and described herein a preferred embodiment of my invention. It is to be understood, however, that the invention is not limited to the precise construction shown and described, but is capable of modification by one skilled in the art, the embodiment shown herein being merely illustrative of the principles of the invention.

I claim as my invention:

1. In a supervisory control system having a plurality of points at a remote station controllable over a supervisory control channel by a plurality of corresponding points at a control station, a plurality of circuit breakers at the remote station each associated with a different one of the points, a synchronism responsive device at the remote station, means responsive to the selection of any one of said circuit breakers for closure for connecting said synchronism responsive device to respond to the potentials on the two sides of the selected breaker, means whereby said synchronism responsive device effects the closure of the selected breaker when synchronism between the potentials on the two sides of the breaker is reached, means responsive to the positions of the circuit breakers for indicating at the control station whether the breakers are open or closed, and means including said indicating means responsive to the said connection of said synchronism responsive device for indicating at the control station that the synchronism responsive device is connected to respond to the potentials on the two sides of the selected circuit breaker.

2. In a supervisory control system having a plurality of points at a remote station controllable over a supervisory control channel by a plurality of corresponding points at a control station, a plurality of circuit breakers at the remote station each associated with a different one of the points, a differential frequency responsive device at the remote station, an indicating device at the control station, means normally connecting the frequency responsive device in controlling relation with the indicating device at the control station over the supervisory control channel, a synchronism responsive device at the remote station, means responsive to the selection of any one of said circuit breakers for closure for connecting said differential frequency responsive device and said synchronism responsive device to respond to the potentials on the two sides of the selected breaker, means whereby said synchronism responsive device effects the closure of the selected breaker when synchronism between the potentials on the two sides of the breaker is reached, means responsive to the positions of the circuit breakers for indicating at the control station whether the breakers are open or closed, and means including said indicating means responsive to said connection of said synchronism responsive device for indicating at the control station that the synchronism responsive device is connected to respond to the potentials on the two sides of the selected circuit breaker.

3. In a supervisory control system having a plurality of points at a remote station controllable over a supervisory control channel by a plurality of corresponding points at a control station, a plurality of circuit breakers at the remote station each associated with a different one of the points, a differential frequency responsive device at the remote station, an indicating device at the control station, means normally connecting the frequency responsive device in controlling relation with the indicating device at the control station over the supervisory control channel, a synchronism responsive device at the remote station, and means responsive to the selection of any one of said circuit breakers for closure for connecting said differential frequency responsive device and said synchronism responsive device to respond to the potentials on the two sides of the selected breaker.

4. In a supervisory control system having a plurality of points at a remote station selectively controllable over a supervisory control channel by a plurality of corresponding points at a control station, a plurality of circuit breakers at the remote station each associated with a different one of the points, a synchronism responsive device at the remote station, means responsive to a first selective operation of a control point other than a breaker point for rendering said synchronism responsive device operative, means responsive to a second selective operation of said control point for rendering said synchronism responsive device inoperative, means responsive to the selection of any one of said circuit breakers for closure after said first selective operation for connecting said synchronism responsive device to respond to the potentials on the two sides of the selected breaker, and means whereby said synchronism responsive device effects the closure of the selected breaker when synchronism between the potentials on the two sides of the breaker is reached.

5. In a supervisory control system having a plurality of points at a remote station selectively controllable over a supervisory control channel by a plurality of corresponding points at a control station, a plurality of circuit breakers at the remote station each associated with a different one of the points, a synchronism responsive device at the remote station, means responsive to a first selective operation of an operation control point other than a breaker point for rendering said synchronism responsive device operative, means responsive to a second selective operation of said control point for rendering said synchronism responsive device inoperative, means responsive to the selection of any one of said circuit breakers for closure while said synchronism responsive device is operative for connecting said synchronism responsive device to respond to the potentials on the two sides of the selected breaker, means whereby said synchronism responsive device effects the closure of the selected breaker when synchronism between the potentials on the two sides of the breaker is reached, and means responsive to the selection of any one of said circuit breakers for closure while the synchronism responsive device is inoperative for closing the selected breaker regardless of the condition of the potentials on the two sides of the breaker.

6. In a supervisory control system having a plurality of points at a remote station controllable over a supervisory control channel by a plurality of corresponding control points at a control station, a plurality of circuit breakers at the remote station each associated with a different one of the points, indicating means associated with each breaker point at the control station operable over the supervisory control system by the change of position of the circuit breakers for indicating the open or closed positions of the breakers, a synchronism responsive device at the remote station, means responsive to a first selective operation of an operation control point for rendering said synchronism responsive device operative, means responsive to a second selective operation of said control point for rendering said synchronism responsive device inoperative, means responsive to the selection of any one of said circuit breakers for closure while said synchronism responsive device is operative for connecting said synchronism responsive device to respond to the potentials on the two sides of the selected breaker and for so controlling the said indicating means associated with the selected breaker as to indicate at the control station that the synchronism responsive device is connected to respond to the potentials on the two sides of the selected breaker, and means whereby said synchronism responsive device effects the closure of the selected breaker when synchronism between the potentials on the two sides of the breaker is reached.

7. In a supervisory control system having a plurality of points at a remote station controllable over a supervisory control channel by a plurality of corresponding control points at a control station, a plurality of circuit breakers at the remote station each associated with a different one of the points, a synchronism responsive device at the remote station, a relay at the remote station associated with each of the breakers, mean responsive to the selection of any one of said circuit breakers for closure for actuating the relay associated with the selected breaker, means responsive to the actuation of said relay for connecting said synchronism responsive device to respond to the potentials on the two sides of the selected breaker, means responsive to the actuation of said relay for preventing the connection of the synchronism responsive device to respond to the potentials on the two sides of any other than the first selected breaker until it is released from connection with the first selected breaker, means whereby the synchronism responsive device causes the closure of the selected breaker when synchronism between the potentials on the two sides of the breaker is reached, and means responsive to the closure of the selected breaker for releasing said relay.

8. In a supervisory control system having a plurality of points at a remote station controllable over a supervisory control channel by a plurality of corresponding control points at a control station, a plurality of circuit breakers at the remote station each associated with a different one of the points, indicating means at the control station responsive to the operation of the circuit breakers for indicating the open and closed positions of the breakers, a synchronism responsive device at the remote station, a relay at the remote station associated with each of the breakers, means responsive to the selection of any one of said circuit breakers for closure for actuating the relay associated with the selected breaker, means responsive to the actuation of said relay for connecting said synchronism responsive device to respond to the potentials on the two sides of the selected breaker, means responsive to the actuation of said relay for causing said breaker position indicating means to indicate that the synchronism responsive device is connected in cooperative relation with the selected breaker, and means whereby the synchronism responsive device causes the closure of the selected breaker when synchronism between the potentials on the two sides of the breaker is reached.

9. In a supervisory control system having a plurality of points at a remote station controllable over a supervisory control channel by a plurality of corresponding control points at a control station, a plurality of circuit breakers at the remote station each associated with a different one of the points, indicating means at the control station responsive to the operation of the breakers for indicating the open and closed positions of the breakers, a synchronism responsive device at the remote station, a relay at the remote station associated with each of the breakers, means responsive to the selection of any one of said circuit breakers for closure for actuating the relay associated with the selected breaker, means responsive to the actuation of the relay associated with the selected breaker for preventing actuation of the relays associated with the other breakers until the relay associated with the selected breaker is released, means responsive to the actuation of the relay associated with the selected breaker for connecting the synchronism responsive device to respond to the potentials on the two sides of the selected breaker, means responsive to the actuation of the relay associated with the selected breaker for causing said indicating means associated with the selected breaker at the control station to indicate that the synchronizing device is connected to the selected breaker, means whereby the synchronism responsive device causes the closure of the selected breaker when synchronism between the potentials on the two sides of the breaker is reached, and means responsive to the closure of the selected breaker for releasing the relay associated with the selected breaker.

10. In a supervisory control system having a plurality of points at a remote station controllable over a supervisory control channel by a plurality of corresponding control points at a control station, a plurality of circuit breakers at the remote station each associated with a different one of the points, a connecting relay and a release relay at the remote station selectively operable from the control station over a control point other than one of the breaker points, a synchronizing relay, a tripping relay and a closing relay associated with each of the breakers, a synchronism responsive device at the remote station, circuit means responsive to the actuation of any of the synchronizing relays for connecting the synchronism responsive device to respond to the potentials on the two sides of the circuit breaker associated with the actuated synchronizing relay, means whereby said synchronism responsive device closes the circuit breaker to which it is connected when synchronism between the potentials on the two sides of the breaker is reached, circuit means responsive to the connecting relay in a first position for connecting each of the synchronizing relays to be actuated upon the selection of its associated circuit breaker for closure, circuit means responsive to the connecting relay in a second position for connecting each of the closing relays to be actuated upon the selection of its associated breaker for closure, means responsive to the actuation of the closing relays for closing their associated breakers, means responsive to the actuation of the release relay for causing said connecting relay to move from its second to its first position, means responsive to the actuation of any closing relay for actuating said release relay, means for selectively actuating the tripping relays from the control station, and means responsive to the actuation of a tripping relay associated with a breaker whose associated synchronizing relay is actuated for releasing such actuated synchronizing relay.

11. In a supervisory control system having a plurality of points at a remote station controllable over a supervisory control channel by a plurality of corresponding control points at a control station, a plurality of circuit breakers at the remote station each associated with a different one of the points, a connecting relay and a release relay at the remote station selectively operable from the control station over a control point other than one of the breaker points, a closing relay associated with each of the breakers, means responsive to the actuation of any closing relay for closing the breaker with which the relay is associated, a synchronism responsive device, a synchronizing relay associated with each of the breakers, means responsive to the actuation of any of the synchronizing relays for connecting the synchronism responsive device to be energized by the potentials on the two sides of the breaker, means whereby the synchronism responsive device closes the breaker with which it is connected when synchronism between the potentials applied thereto is reached, and means responsive to the selective operation of said connecting relay and said release relay for selectively rendering the plurality of closing relays or the plurality of synchronizing relays responsive to a closing operation of the points with which their associated breakers are associated.

12. In a supervisory control system having a plurality of points at a remote station controllable over a supervisory control channel by a plurality of corresponding control points at a control station, a plurality of circuit breakers at the remote station each associated with a different one of the points, a connecting relay and a release relay at the remote station selectively operable from the control station over a control point other than one of the breaker points, a closing relay associated with each of the breakers, means responsive to the actuation of any closing relay for closing the breaker with which the relay is associated, a synchronism responsive device, a synchronizing relay associated with each of the breakers, means responsive to the actuation of any of the synchronizing relays for connecting the synchronism responsive device to be energized by the potentials on the two sides of the breaker, means whereby the synchronism responsive device closes the breaker with which it is connected when synchronism between the potentials applied thereto is reached, means responsive to the selective operation of said connecting relay and said release relay for selectively rendering the plurality of closing relays or the plurality of synchronizing relays responsive to a closing operation of the points with which their associated breakers are associated, and means responsive to the operation of one of said closing relays for rendering the synchronizing relays responsive to subsequent closing operations of the breaker points.

13. In a supervisory control system having a plurality of points at a remote station controllable over a supervisory control channel by a plurality of corresponding control points at a control station, a plurality of circuit breakers at the remote station each associated with a different one of the points, a connecting relay and a release relay at the remote station selectively operable from the control station over a control point other than one of the breaker points, a closing relay associated with each of the breakers, means responsive to the actuation of any closing relay for closing the breaker with which the relay is associated, a synchronism responsive device, a synchronizing relay associated with each of the breakers, means responsive to the actuation of any of the synchronizing relays for connecting the synchronism responsive device to be energized by the potentials on the two sides of the breaker, means whereby the synchronism responsive device closes the breaker with which it is connected when synchronism between the potentials applied thereto is reached, means responsive to the selective operation of said connecting relay and said release relay for selectively rendering the plurality of closing relays or the plurality of synchronizing relays responsive to a closing operation of the points with which their associated breakers are associated, means responsive to the actuation of any one of the synchronizing relays for rendering the other synchronizing relays inoperative, and means responsive to the closure of the selected breaker for rendering the several synchronizing relays operative.

14. In a supervisory control system having a plurality of points at a remote station controllable over a supervisory control channel by a plurality of corresponding control points at a control station, a plurality of circuit breakers at the remote station each associated with a different one of the points, a tripping relay associated with each of the breakers, means responsive to a tripping operation of a selected control point for actuating the tripping relay associated with the selected point, a closing relay associated with each of the breakers, a synchronizing device at the remote station, a synchronizing relay associated with each of the breakers, means responsive to the actuation of any synchronizing relay for connecting the synchronizing device to respond to the potentials on the opposite sides of the breaker with which the synchronizing relay is associated, means whereby said synchronizing device will close the circuit breaker with which it is connected when synchronism between the potentials on the opposite sides of the breaker is reached, connecting relay means selectively actuable and releasable by a control point other than one of the breaker points, circuit means controlled by said connecting relay means in released position for rendering said synchronizing relays operable and said closing relays inoperable, circuit means controlled by said connecting relay means in actuated position for rendering said closing relays operable and said synchronizing relays inoperable, means responsive to a breaker closure operation of a selected breaker point for actuating the one of the closing and synchronizing relays associated with the breaker which is operable when the breaker closure operation occurs, and means whereby the actuation of any tripping relay will release the synchronism relay associated with the same point if such relay is in actuated position and will trip the associated breaker if such breaker is closed.

15. In a supervisory control system having a plurality of points at a remote station controllable over a supervisory control channel by a plurality of corresponding control points at a control station, a plurality of circuit breakers at the remote station each associated with a different one of the points, a tripping relay associated with each of the breakers, means responsive to a tripping operation of a selected control point for actuating the tripping relay associated with the selected point, a closing relay associated with each of the breakers, a synchronizing device at the remote station, a synchronizing relay associated with each of the breakers, means responsive to the actuation of any synchronizing relay for connecting the synchronizing device to respond to the potentials on the opposite sides of the breaker with which the synchronizing relay is associated, means whereby said synchronizing device will close the circuit breaker with which it is connected when synchronism between the potentials on the opposite sides of the breaker is reached, connecting relay means selectively actuable and releasable by a control point other than one of the breaker points, circuit means controlled by said connecting relay means in released position for rendering said synchronizing relays operable and said closing relays inoperable, circuit means controlled by said connecting relay means in actuated position for rendering said closing relays operable and said synchronizing relays inoperable, means responsive to a breaker closure operation of a selected breaker point for actuating the one of the closing and synchronizing relays associated with the breaker which is operable when the breaker closure operation occurs, means whereby the actuation of any tripping relay will release the synchronism relay associated with the same point if such relay is in actuated position and will trip the associated breaker if such breaker is closed, and means responsive to the actuation of one of said closing relays for causing the said connecting relay means to render the synchronizing relays responsive to subsequent closing operations of the breaker points.

16. In a supervisory control system having a plurality of points at a remote station controllable over a supervisory control channel by a plurality of corresponding control points at a control station, a plurality of circuit breakers at the remote station each associated with a different one of the points, a tripping relay associated with each of the breakers, means responsive to a tripping operation of a selected control point for actuating the tripping relay associated with the selected point, a closing relay associated with each of the breakers, a synchronizing device at the remote station, a synchronizing relay associated with each of the breakers, means responsive to the actuation of any synchronizing relay for connecting the synchronizing device to respond to the potentials on the opposite sides of the breaker with which the synchronizing relay is associated, means whereby said synchronizing device will close the circuit breaker with which it is connected when synchronism between the potentials on the opposite sides of the breaker is reached, connecting relay means selectively actuable and releasable by a control point other than one of the breaker points, circuit means controlled by said connecting relay means in released position for rendering said synchronizing relays operable and said closing relays inoperable, circuit means controlled by said connecting relay means in actuated position for rendering said closing relays operable and said synchronizing relays inoperable, means responsive to a breaker closure operation of a selected breaker point for actuating the one of the closing and synchronizing relays associated with the breaker which is operable when the breaker closure operation occurs, means whereby the actuation of any tripping relay will release the synchronism relay associated with the same point if such relay is in actuated position and will trip the associated breaker if such breaker is closed, means responsive to the actuation of any one of the synchronizing relays for rendering the other synchronizing relays inoperative, and means responsive to the closure of the selected breaker for rendering the several synchronizing relays responsive to subsequent closing operations of the breaker points.

17. In a supervisory control system having a plurality of points at a remote station controllable over a supervisory control channel by a plurality of corresponding control points at a control station, a plurality of circuit breakers each associated with a different one of the points at the remote station, indicating means selectively connectible to certain of the supervisory control points other than the circuit breaker control points, means for releasing the indicating means from the indicating control points, a variable potential device at the remote station, a potential responsive indicator at the control station, means responsive to the release of the indicating means for connecting the variable potential device and the potential responsive device in circuit over the supervisory control channel, a frequency differential responsive device at the remote station responsive to the difference between the frequencies of two potentials when connected thereto, circuit means whereby said differential frequency responsive device varies the potential applied to the potential responsive indicator by said variable potential device to thereby indicate at the control station the frequency differential between potentials applied to the differential frequency responsive device, a synchronizing device at the remote station, and means responsive to a closing operation of a selected breaker for connecting said differential frequency responsive device and said synchronizing device to be energized by the potentials on the two sides of the selected breaker.

18. In combination with a supervisory control system extending over a supervisory control channel between a plurality of selectively connectible and releasable sets of metering devices operable over separate points of the system, a potential responsive indicating device at the control station, a variable potential device at the remote station, and means responsive to the release of all of the sets of metering devices for connecting said indicating device and said varable potential device in circuit over the supervisory control channel.

19. In a supervisory control system having a plurality of points at a remote station selectively controllable over a supervisory control channel by a plurality of corresponding control points at a control station, a plurality of circuit breakers at the remote station selectively operable over the supervisory control system, indicating means associated with the individual breaker points for indicating at the control station the positions of the breakers at the remote station, metering means operable over certain of the control points, frequency differential indicating means, means responsive to the release of all of the metering points for connecting said frequency differential indicating means for operation over the supervisory control channel, a synchronizing device at the remote station, means selectively operable over a control point other than the breaker and metering points for preparing the breakers for closure by direct supervisory control or by means of the synchronizing device, a frequency differential responsive device at the remote station, circuit means whereby said frequency differential responsive device controls said frequency differential indicating means, and means responsive to the selective closure operation of any breaker point while the breakers are prepared for closure by the synchronizing device for connecting said synchronizing device and said differential frequency responsive device to be energized by the potentials on the opposite sides of the selected breaker and for causing the position indicating means associated with the selected breaker to indicate that the synchronizing device is connected to the selected breaker.

WILLARD A. DERR.